United States Patent
Delfort et al.

(10) Patent No.: US 9,421,493 B2
(45) Date of Patent: Aug. 23, 2016

(54) METHOD FOR ELIMINATING ACID COMPOUNDS FROM A GASEOUS EFFLUENT WITH AN ABSORBENT SOLUTION MADE FROM BIS(AMINO-3-PROPYL)ETHERS

(71) Applicant: IFP Energies nouvelles, Rueil-Malmaison (FR)

(72) Inventors: Bruno Delfort, Paris (FR); Dominique Le Pennec, Orgerus (FR); Fabien Porcheron, Rueil Malmaison (FR); Thierry Huard, Saint Symphorien d'Ozon (FR); Julien Grandjean, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 169 days.

(21) Appl. No.: 14/361,310

(22) PCT Filed: Oct. 18, 2012

(86) PCT No.: PCT/FR2012/000425
§ 371 (c)(1),
(2) Date: May 29, 2014

(87) PCT Pub. No.: WO2013/079816
PCT Pub. Date: Jun. 6, 2013

(65) Prior Publication Data
US 2014/0311342 A1    Oct. 23, 2014

(30) Foreign Application Priority Data
Nov. 30, 2011  (FR) ...................................... 11 03656

(51) Int. Cl.
*B01D 53/14* (2006.01)
*B01D 53/52* (2006.01)
*B01D 53/62* (2006.01)

(52) U.S. Cl.
CPC ....... *B01D 53/1493* (2013.01); *B01D 53/1425* (2013.01); *B01D 53/1456* (2013.01);
(Continued)

(58) Field of Classification Search
CPC ................ B01D 2252/103; B01D 2252/2041; B01D 2252/20431; B01D 2252/20447; B01D 2252/502; B01D 2252/504; B01D 2257/304; B01D 2257/308; B01D 2257/504; B01D 53/14; B01D 53/1425; B01D 53/1456; B01D 53/1462; B01D 53/1468; B01D 53/1493; B01D 53/52; B01D 53/62; Y02C 10/04; Y02E 50/343
See application file for complete search history.

(56) References Cited

U.S. PATENT DOCUMENTS 3,480,675 A    11/1969  Poppelsdorf
4,405,582 A    9/1983   Stogryn et al.
(Continued)

FOREIGN PATENT DOCUMENTS

EP    0 087 856 B1   2/1986
FR    2 898 284       9/2007
(Continued)

OTHER PUBLICATIONS

G. Sartori, et al: "Sterically Hindered Amines for CO2 Removal from Gases," Industrial Engineering and Chemistry Fundamentals, 22, (1983), pp. 239-249.
(Continued)

*Primary Examiner* — Duane Smith
*Assistant Examiner* — Cabrena Holecek
(74) *Attorney, Agent, or Firm* — Fitch, Even, Tabin & Flannery LLP

(57) ABSTRACT

The method of removing acid compounds contained in a gaseous effluent consists in contacting in column C1 a gaseous effluent with an absorbent solution 4 made up of an aqueous solution of one or more diamines belonging to the bis(amino-3-propyl)ether or (amino-2-ethyl)-(amino-3-propyl)ether family.

10 Claims, 1 Drawing Sheet

(52) U.S. Cl.
CPC ....... *B01D53/1462* (2013.01); *B01D 53/1468* (2013.01); *B01D 53/52* (2013.01); *B01D 53/62* (2013.01); *B01D 2252/103* (2013.01); *B01D 2252/2041* (2013.01); *B01D 2252/20431* (2013.01); *B01D 2252/20447* (2013.01); *B01D 2252/502* (2013.01); *B01D 2252/504* (2013.01); *B01D 2257/304* (2013.01); *B01D 2257/308* (2013.01); *B01D 2257/504* (2013.01); *Y02C 10/04* (2013.01); *Y02E 50/343* (2013.01)

(56) References Cited

U.S. PATENT DOCUMENTS

| | | | |
|---|---|---|---|
| 4,965,362 | A | 10/1990 | Merger et al. |
| 5,268,499 | A | 12/1993 | Merger et al. |
| 8,523,978 | B2 | 9/2013 | Rojey et al. |
| 2009/0199709 | A1 | 8/2009 | Rojey et al. |
| 2010/0105551 | A1 | 4/2010 | Kim et al. |
| 2011/0176981 | A1* | 7/2011 | Jacquin ............... B01D 53/1493 423/228 |
| 2011/0185901 | A1* | 8/2011 | Jacquin ............... B01D 53/1493 95/209 |
| 2011/0232489 | A1* | 9/2011 | Holub ................. B01D 53/1456 95/156 |
| 2013/0055895 | A1 | 3/2013 | Menzel et al. |

FOREIGN PATENT DOCUMENTS

| | | |
|---|---|---|
| JP | 08-257353 A | 10/1996 |
| WO | 2009/059148 A2 | 5/2009 |
| WO | 2010/077548 A1 | 7/2010 |
| WO | 2011/082807 A1 | 7/2011 |

OTHER PUBLICATIONS

G. Sartori, et al: Separation and Purification Methods, 16 (2) (1987), pp. 171-200.

J. Fakstorp, et al: "Bifunctional Amines and Ammonium Compounds, II. Bis-B-dialkylaminoetheyl Ethers and Their Quternary Ammonium Halides," Acta Chemica Scandinavia, (1953), pp. 134-139.

* cited by examiner

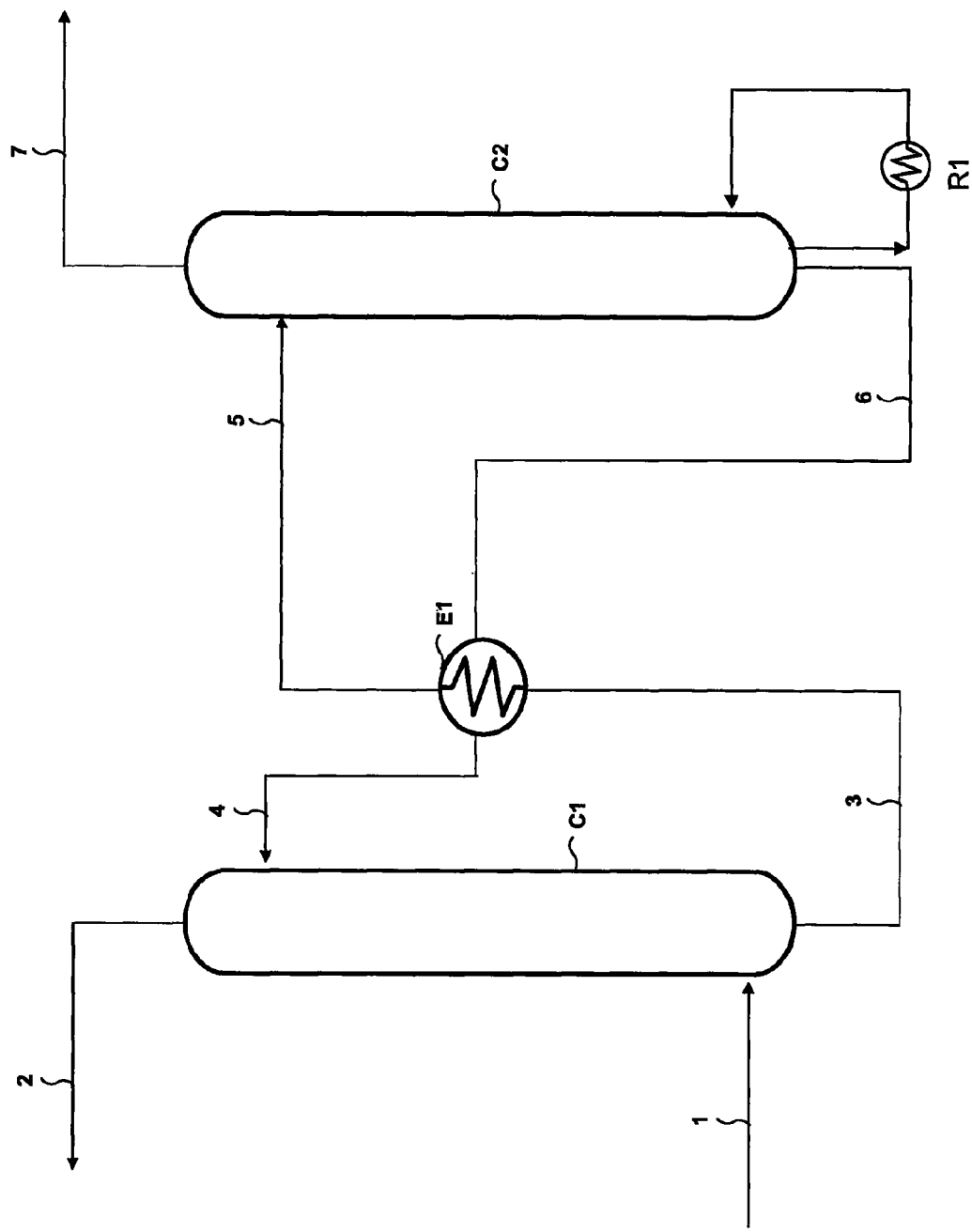

METHOD FOR ELIMINATING ACID COMPOUNDS FROM A GASEOUS EFFLUENT WITH AN ABSORBENT SOLUTION MADE FROM BIS(AMINO-3-PROPYL)ETHERS

FIELD OF THE INVENTION

The present invention relates to the sphere of gaseous effluent deacidizing methods. The invention is advantageously applied for treating gas of industrial origin and natural gas.

BACKGROUND OF THE INVENTION

Absorption methods using an aqueous amine solution are commonly used for removing acid compounds (notably $CO_2$, $H_2S$, COS, $CS_2$, $SO_2$ and mercaptans) present in a gas. The gas is deacidized by contacting with the absorbent solution, then the absorbent solution is thermally regenerated. For example, document U.S. Pat. No. 6,852,144 describes a method of removing acid compounds from hydrocarbons. The method uses a water-N-methyldiethanolamine or water-triethanolamine absorbent solution containing a high proportion of a compound belonging to the following group: piperazine and/or methylpiperazine and/or morpholine.

One limitation of the absorbent solutions commonly used in deacidizing applications is their insufficient $H_2S$ absorption selectivity in relation to $CO_2$. Indeed, in some natural gas deacidizing cases, selective $H_2S$ removal is sought by limiting to the maximum $CO_2$ absorption. This constraint is particularly important for gases to be treated with a $CO_2$ content that is already less than or equal to the desired specification. A maximum $H_2S$ absorption capacity is then sought with maximum $H_2S$ absorption selectivity in relation to $CO_2$. This selectivity allows to maximize the amount of treated gas produced and to recover an acid gas at the regenerator outlet having the highest $H_2S$ concentration possible, which limits the size of the sulfur chain units downstream from the treatment and guarantees better operation. In some cases, an $H_2S$ enrichment unit is necessary for concentrating the acid gas in $H_2S$. In this case, the most selective amine is also sought. Tertiary amines such as N-methyldiethanolamine or hindered amines exhibiting slow reaction kinetics with $CO_2$ are commonly used, but their selectivities are limited to high $H_2S$ feed ratios.

Another limitation of the absorbent solutions commonly used in total deacidizing applications is too slow $CO_2$ or COS capture kinetics. In cases where the desired $CO_2$ or COS specifications level is very high, the fastest possible reaction kinetics is sought so as to reduce the height of the absorption column, this equipment under pressure, typically between 20 bars and 90 bars, representing a significant part of the investment costs of the process.

Whether seeking maximum $CO_2$ and COS capture kinetics in a total deacidizing application, or minimum $CO_2$ capture kinetics in a selective application, it is always desirable to use an absorbent solution having the highest cyclic capacity possible. This cyclic capacity, denoted by $\Delta\alpha$, corresponds to the feed ratio difference ($\alpha$ designates the number of moles of absorbed acid compounds $n_{acid\ gas}$ per kilogram of absorbent solution) between the absorbent solution fed to the absorption column and the absorbent solution discharged from the bottom of said column. Indeed, the higher the cyclic capacity of the absorbent solution, the more limited the absorbent solution flow rate required for deacidizing the gas to be treated. In gas treatment methods, reduction of the absorbent solution flow rate also has a great impact on the reduction of investments, notably as regards absorption column sizing.

Another essential aspect of gas or industrial fumes treatment operations using an absorbent solution remains the regeneration of the separation agent. Regeneration through expansion and/or distillation and/or entrainment by a vaporized gas referred to as "stripping gas" is generally considered depending on the absorption type (physical and/or chemical).

Notably, a limitation of the absorbent solutions commonly used today is the energy consumption necessary for solvent regeneration that is too high. This is particularly true in cases where the acid gas partial pressure is low. For example, for a 30 wt. % 2-aminoethanol (or monoethanolamine or ethanolamine or MEA) aqueous solution used for post-combustion $CO_2$ capture in thermal power plant fumes, where the $CO_2$ partial pressure is of the order of 0.12 bar, the regeneration energy represents approximately 3.7 GJ per ton of $CO_2$ captured. Such an energy consumption represents a significant operating cost for the $CO_2$ capture process.

It is well known to the person skilled in the art that the energy required for regeneration by distillation of an amine solution can be divided into three different items: the energy required for heating the absorbent solution between the top and the bottom of the regenerator, the energy required for lowering the acid gas partial pressure in the regenerator by vaporization of a stripping gas, and the energy required for breaking the chemical bond between the amine and the $CO_2$.

These first two items are inversely proportional to the absorbent solution flows to be circulated in the plant in order to achieve a given specification. In order to decrease the energy consumption linked with the regeneration of the solvent, the cyclic capacity of the solvent is therefore once again preferably maximized.

The last item relates to the energy required for breaking the bond created between the amine used and the $CO_2$. To decrease the energy consumption linked with the regeneration of the absorbent solution, the binding enthalpy $\Delta H$ is thus preferably minimized. However, it is not easy to find a solvent with a high cyclic capacity and a low reaction enthalpy. The best absorbent solution from an energy point of view is therefore the one allowing to reach the best compromise between a high cyclic capacity $\Delta\alpha$ and a low binding enthalpy $\Delta H$.

The chemical stability of the absorbent solution is also an essential issue in gas deacidizing and treatment processes. Degradation resistance is a limitation for the commonly used absorbent solutions, notably under regeneration conditions at temperatures ranging between 160° C. and 180° C. considered in $CO_2$ capture processes. These conditions would allow the $CO_2$ to be recovered at a pressure ranging between 5 and 10 bars, thus enabling to save energy on the compression of the $CO_2$ captured with a view to the transport and storage thereof.

It is thus difficult to find compounds or a family of compounds allowing the various deacidizing processes to operate at lower operating costs (including the regeneration energy and the costs related to losses due to degradation) and investment costs (including the cost of the absorption column), in terms of post-combustion $CO_2$ capture as well as gas treatment deacidizing.

It is well known to the person skilled in the art that tertiary amines or secondary amines with severe steric hindrance, as described in the articles by G. Sartori et al. published in Industrial Engineering and Chemistry Fundamentals, 22, (1983), 239-249, and Separation and Purification Methods, 16 (2) (1987), 171-200, have slower $CO_2$ capture kinetics than little-hindered primary or secondary amines. On the other hand, tertiary or secondary amines with severe steric hindrance have instantaneous $H_2S$ capture kinetics, which allows selective $H_2S$ removal based on distinct kinetic performances.

Among the applications of these tertiary or hindered amines, U.S. Pat. No. 4,405,582 describes a method of selective $H_2S$ removal from gases containing $H_2S$ and $CO_2$ by means of an absorbent containing amines of diaminoether type where at least one of the two amine functions is tertiary.

Patent JP-8,257,353 describes a method of capturing $CO_2$ in combustion fumes, based on amine solutions corresponding to the general formula:

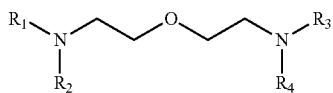

The general formula of the diamine provided in this patent exclusively imposes as the alkyl ether unit joining the two nitrogen atoms an ethoxy ethyl-CH2CH2—O—CH2—CH2-unit. More particularly, the compound of interest is bis(2-dimethylaminoethyl)ether in contact with combustion fumes. However, this document does not describe the degradation resistance performances of this molecule.

The inventors have discovered that amines of diaminoether type are not equivalent in terms of performance for use in absorbent solution formulations for acid gas treatment in an industrial process. Some molecules of diaminoether type have insufficient performances, notably as regards the chemical stability thereof, for suitable use in acid gas treatment. A contrario, other molecules exhibit particularly high chemical stability and absorption performances.

The object of the present invention is the use of particular molecules belonging to the bis(aminoalkyl)ether family exhibiting optimum performances for $CO_2$ capture capacity, selective $H_2S$ removal and thermal stability within the context of gas deacidizing. These bis(aminoalkyl)ethers exhibit the specific feature of having at least one dialkyl aminopropyl ether unit. More precisely, these molecules are bis(dialkylamino-3-propyl)ethers with the general formula as follows:

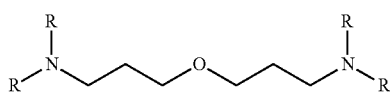

and (dialkylamino-2-ethyl)-(dialkylamino-3-propyl)ethers with the general formula:

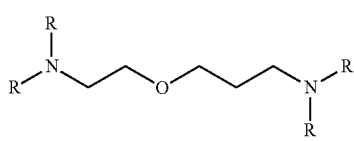

In both general formulas (I) and (II), each radical R is independently selected from among a methyl radical or an ethyl radical.

SUMMARY OF THE INVENTION

In general terms, the present invention is defined by a method of removing acid compounds contained in a gaseous effluent, wherein an acid compound absorption stage is carried out by contacting the effluent with an absorbent solution comprising:
water,
at least one diamine selected from among the molecules with general formulas (I) and (II):

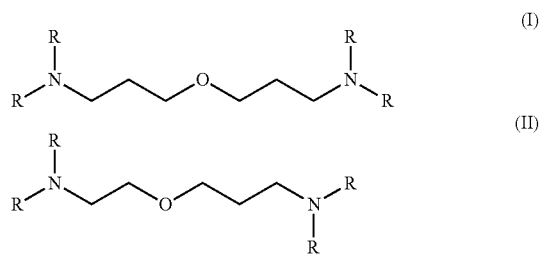

wherein each radical R is independently selected from among a methyl radical or an ethyl radical.

According to the invention, the diamine can be selected from among one of the following molecules:

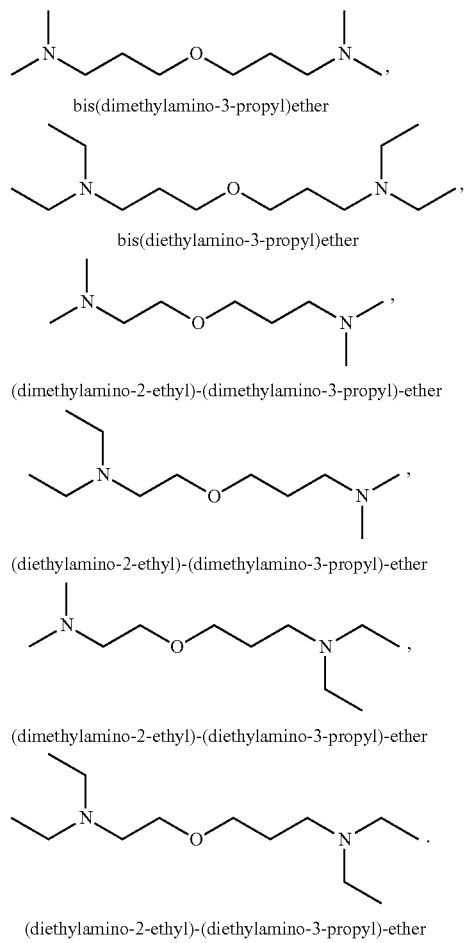

The absorbent solution can comprise between 10 and 90 wt. % of said diamine and between 10 and 90 wt. % water.

The absorbent solution can also comprise a non-zero proportion below 20 wt. % of a primary or secondary amine. Said primary or secondary amine is selected from the group consisting of:
MonoEthanolAmine,
N-butylethanolamine,
Aminoethylethanolamine,
Diglycolamine,
piperazine,
N-(2-hydroxyethyl)piperazine,
N-(2-aminoethyl)piperazine,
Morpholine,
3-(methylamino)propylamine,
1,6-hexanediamine,
N,N'-dimethyl-1,6-hexanediamine.

The absorbent solution can furthermore comprise a physical solvent selected from among methanol and sulfolane.

The acid compound absorption stage can be carried out at a pressure ranging between 1 bar and 120 bars, and at a temperature ranging between 20° C. and 100° C.

After the absorption stage, a gaseous effluent depleted in acid compounds and an absorbent solution laden with acid compounds can be obtained, and at least one stage of regenerating the absorbent solution laden with acid compounds can be performed.

The regeneration stage can be carried out at a pressure ranging between 1 bar and 10 bars, and at a temperature ranging between 100° C. and 180° C.

The gaseous effluent can be selected from among natural gas, syngas, combustion fumes, refinery gas, acid gas from amine units, Claus tail gas, biomass fermentation gas, cement plant gas and incinerator fumes.

In cases where the gaseous effluent comprises $H_2S$ and $CO_2$, the method can be implemented for selective $H_2S$ removal over $CO_2$.

Using bis(aminoalkyl)ether compounds according to the invention allows to obtain higher cyclic capacities than the reference amines, in applications where the acid gas partial pressure is low (for example for capture of the $CO_2$ contained in combustion fumes) as well as applications where the acid gas partial pressure is high (for example natural gas treatment). This performance is increased as a result of a higher density of the amine sites in relation to the molar mass of the molecules, and also because a single molecule has two tertiary functions that cannot form carbamates.

Besides, the compounds according to the invention have a higher selectivity towards $H_2S$ than the reference amines, due to the higher density of the tertiary amine sites whose reaction kinetics with respect to $CO_2$ is slow.

Furthermore, in the particular case of a natural gas treatment application where the absorbent solution contains a diamine according to the invention in admixture with a primary or secondary amine, the invention allows to accelerate the COS absorption kinetics in relation to a MDEA solution containing the same proportion of primary or secondary amine. This COS absorption kinetics gain allows to save on the cost of the absorption column in cases where removal of these compounds at a high level of specifications (1 ppm) is required.

Moreover, the bis(aminoalkyl)ethers according to the invention exhibit a low degradation rate at high temperature in relation to the amine-based absorbent solutions of the prior art. It is therefore possible to regenerate the absorbent solution according to the invention at higher temperature and pressure, and thus to produce an acid gas at higher pressure. This is particularly interesting in the case of capture of the $CO_2$ contained in fumes where the acid gas must be compressed to be liquefied prior to injection into an underground reservoir.

BRIEF DESCRIPTION OF THE FIGURES

Other features and advantages of the invention will be clear from reading the description hereafter, with reference to FIG. 1 showing a block diagram of an acid gas treating method.

DETAILED DESCRIPTION

The present invention aims to remove acid compounds from a gaseous effluent using an aqueous solution of bis (dialkylamino-3-propyl)ether with the general formula:

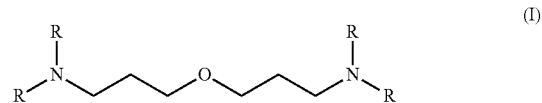

or of (dialkylamino-2-ethyl)-(dialkylamino-3-propyl)ether with the general formula:

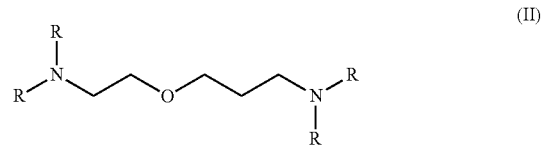

each radical R in the general formulas being independently selected from among a methyl radical or an ethyl radical.

Synthesis of bis(dialkylamino-3-propyl)ethers

These molecules of the invention can be synthesized according to any route permitted by organic chemistry. Some of them can be mentioned by way of non exhaustive example. They are represented by the diagram hereafter and require some comments.

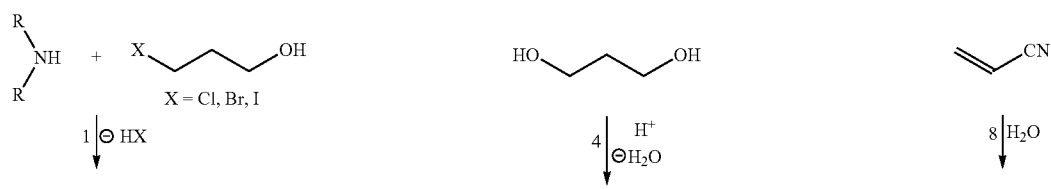

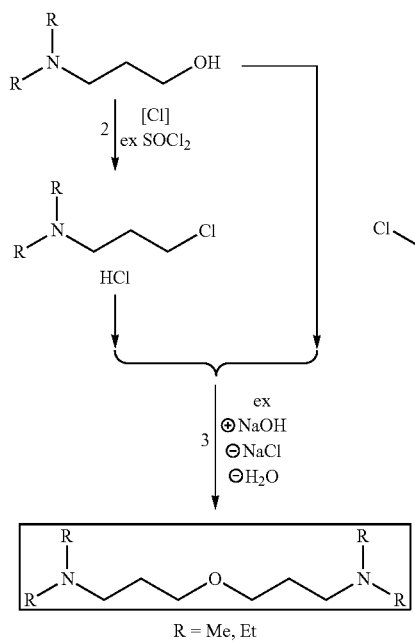
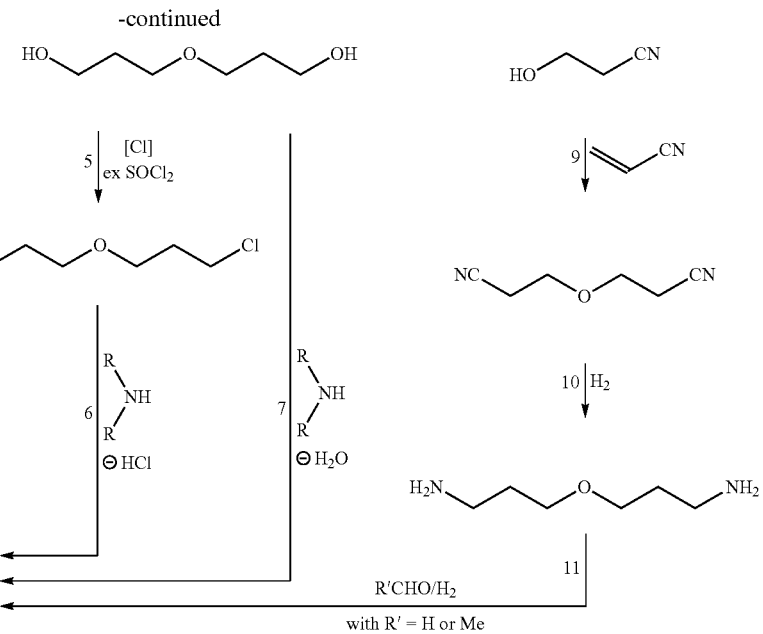

A first route is represented by the succession of stages 1, 2 and 3. According to this route, the 3-dimethylaminopropanol or the 3-diethylaminopropanol is prepared by condensation of a 3-halogenopropanol, 3-chloropropanol for example, with dimethylamine or diethylamine. Part of the 3-dialkylaminopropanol is then converted to dialkylaminopropyl chloride generally isolated as hydrochloride. This reaction is conducted with means known to the person skilled in the art, for example with thionyl chloride. Finally, the 3-dialkylaminopropyl chloride is condensed with the dialkylaminopropanol or the alcoholate form thereof so as to lead to the bis(3-dialkylaminopropyl)ether of the invention. This synthesis route is notably described in U.S. Pat. No. 3,480,675 (1969) and in the articles by J. Fakstorp et al. published in Acta Chemica Scandinavia, (1953), 134-139 et ibid., (1954), 350-353.

A second route is represented by the succession of stages 4, 5 and 6. According to this route, the bis(3-hydroxypropyl) ether is obtained by condensation-etherification of 1,3-propanediol, generally in an acid medium. This stage is notably described in patent WO-2009/059,148 (2007). This diol is then converted by means of a chlorination agent such as thionyl chloride to bis(3-chloropropyl)ether that is subjected to the reaction of the dimethylamine or the diethylamine so as to lead to the bis(3-dialkylaminopropyl)ether of the invention. A variant of this route consists in carrying out the dimethylamine or diethylamine condensation reaction directly on the diol bis(3-hydroxypropyl)ether without going through the chlorination stage (stage 7 instead of the sequence of stages 5+6).

A third route strings together stages 8, 9, 10 and 11 and it consists in carrying out hydrolysis of an acrylonitrile molecule leading to 3-hydroxyprorionitrile that is converted to bis(2-cyanoethyl)ether by reaction with a second acrylonitrile molecule. This reaction is notably described in U.S. Pat. No. 4,965,362 (1989) and U.S. Pat. No. 5,268,499 (1993). The bis(2-cyanoethyl)ether is then hydrogenated and the reduction of the nitrile functions to primary amine functions, which is a well-controlled industrial reaction, leads to the diamine bis(3-aminopropyl)ether that is then methylated or ethylated using well-known means, notably reductive amination with formaldehyde or acetaldehyde in the presence of hydrogen and of a suitable catalyst. This last reaction leads to the bis(3-dialkylaminopropyl)ether of the invention. This route affords the advantage of using as the base material only very large tonnage products, abundant and inexpensive, such as acrylonitrile, hydrogen, formaldehyde or acetaldehyde. It also involves the advantage of using only selective and industrially well-controlled reactions free of halogenides and generating no by-product.

A variant of this route (not shown in the FIGURE) can use acrylamide instead of acrylonitrile. The hydrolysis stage leads to propanamide,3,3'-oxybis that is hydrogenated to bis(3-aminopropyl)ether, then methylated or ethylated. A second variant of this route (not shown in the FIGURE) uses N,N-dimethylacrylamide or N,N-diethylacrylamide instead of acrylonitrile. The hydrolysis stage leads to N,N-dimethylpropanamide,3,3'-oxybis or to N,N-diethylpropanamide,3,3'-oxybis. Finally, an amide function hydrogenation stage leads to the diamines of the invention.

Synthesis of (dialkylamino-2-ethyl)-(dialkylamino-3-propyl)ethers

These molecules of the invention can be synthesized according to any route permitted by organic chemistry. Some of them can be mentioned by way of non exhaustive example. They are represented by the below diagram and require some comments.

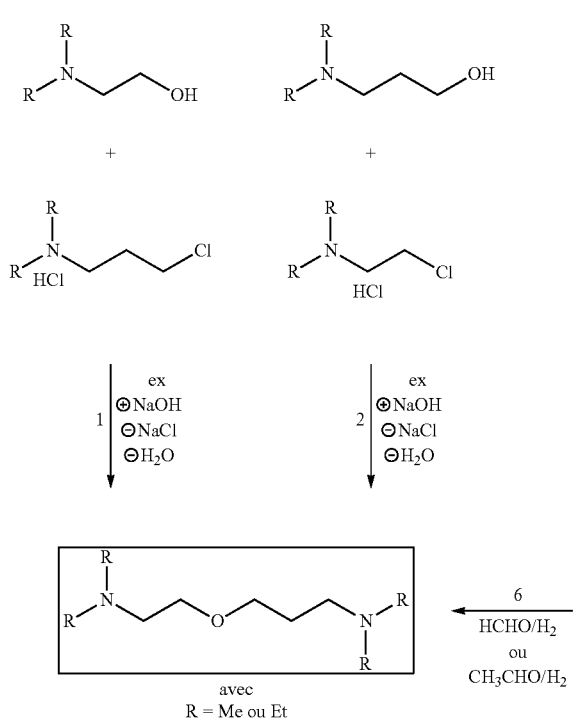
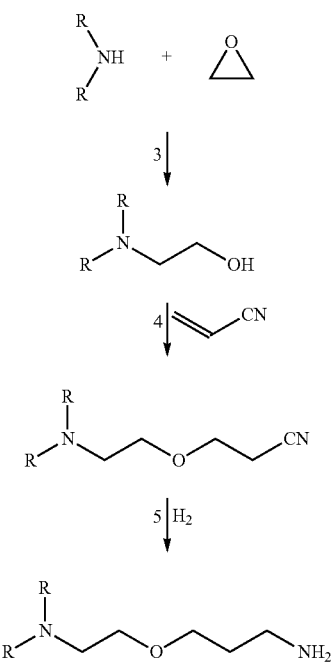

A first route is represented by stage 1. According to this route, the (dialkylamino-2-ethyl)-(dialkylamino-3-propyl) ether is prepared by condensation of a 3-dialkylaminopropyl chloride often available in hydrochloride form with a 2-dialkylaminoethanol or the alcoholate form thereof so as to lead to the (dialkylamino-2-ethyl)-(dialkylamino-3-propyl) ether of the invention.

A second route is represented by stage 2. According to this route, the (dialkylamino-2-ethyl)-(dialkylamino-3-propyl) ether is prepared by condensation of a 2-dialkylaminoethyl chloride often available in hydrochloride form with a 3-dialkylaminopropanol or the alcoholate form thereof so as to lead to the (dialkylamino-2-ethyl)-(dialkylamino-3-propyl) ether of the invention.

This synthesis route is notably described in U.S. Pat. No. 3,480,675 (1969) and in the articles by J. Fakstorp et al. published in Acta Chemica Scandinavia, (1953), 134-139 et ibid., (1954), 350-353.

A third route strings together stages 3, 4, 5 and 6 and it consists in carrying out addition of a 2-dialkylaminoethanol molecule and of an acrylonitrile molecule according to reaction 4 so as to lead to (dialkylamino-2-ethyl)-(3-cyanoethyl)ether. The 2-dialkylaminoethanol can be prepared by reaction 1 of dialkylamine addition to ethylene oxide. The (dialkylamino-2-ethyl)-(3-cyanoethyl)ether is then hydrogenated to (dialkylamino-2-ethyl)-(3-aminopropyl)ether according to reaction 5. Finally, the primary amine function of the (dialkylamino-2-ethyl)-(3-aminopropyl)ether is methylated or ethylated using well-known means, notably reductive amination with formaldehyde or acetaldehyde in the presence of hydrogen and of a suitable catalyst for leading to the (dialkylamino-2-ethyl)-(dialkylamino-3-propyl)ether of the invention. This route affords the advantage of using as the base material only very large tonnage products, abundant and inexpensive, such as ethylene oxide, dimethylamine, diethylamine, acrylonitrile, hydrogen, formaldehyde or acetaldehyde. It also involves the advantage of using only selective and industrially well-controlled reactions free of halogenides and generating no by-product.

A variant of this route (not shown in the FIGURE) can use acrylamide instead of acrylonitrile. The reduction of the residual amide function leads to (dialkylamino-2-ethyl)-(3-aminopropyl)ether.

Nature of the Gaseous Effluents

The absorbent solutions according to the invention can be used to deacidize the following gaseous effluents: natural gas, syngas, combustion fumes, refinery gas, acid gas from amine units, Claus tail gas, biomass fermentation gas, cement plant gas and incinerator fumes. These gaseous effluents contain one or more of the following acid compounds: $CO_2$, $H_2S$, mercaptans, COS, $CS_2$, $SO_2$.

The method according to the invention is well suited for capturing the $CO_2$ contained in combustion fumes. Combustion fumes are produced notably by the combustion of hydrocarbons, biogas, coal in a boiler or for a combustion gas turbine, for example in order to produce electricity. By way of illustration, the method according to the invention can be implemented for absorbing at least 70%, preferably at least 80% or even at least 90% of the $CO_2$ contained in combustion fumes. These fumes generally have a temperature ranging between 20° C. and 60° C., a pressure ranging between 1 and 5 bars, and they can comprise between 50 and 80% nitrogen, between 5 and 40% carbon dioxide, between 1 and 20% oxygen, and some impurities such as SOx and NOx if they have not been removed upstream from the deacidizing process. In particular, the method according to the invention is particularly well suited for absorbing the $CO_2$ contained in combustion fumes comprising a low $CO_2$ partial pressure, for example a $CO_2$ partial pressure below 200 mbars.

The method according to the invention can be implemented for deacidizing a syngas. Syngas contains carbon monoxide CO, hydrogen $H_2$ (generally with a $H_2$/CO ratio of 2), water vapour (generally at saturation at the wash temperature) and carbon dioxide $CO_2$ (of the order of 10%). The pressure generally ranges between 20 and 30 bars, but it can reach up to 70 bars. It also comprises sulfur-containing ($H_2S$, COS, etc.), nitrogen-containing ($NH_3$, HCN) and halogenated impurities, as well as heavy metals.

The method according to the invention can be implemented for deacidizing a natural gas. Natural gas predominantly consists of gaseous hydrocarbons, but it can contain some of the following acid compounds: $CO_2$, $H_2S$, mercaptans, COS, $CS_2$. The proportion of these acid compounds is very variable and it can reach up to 40% for $CO_2$ and $H_2S$. The temperature of the natural gas can range between 20° C. and 100° C. The pressure of the natural gas to be treated can range between 10 and 120 bars. The invention can be implemented in order to reach specifications generally imposed on the deacidized gas, which are less than 2 vol. % $CO_2$, or even less than 50 vol·ppm $CO_2$ so as to carry out liquefaction of the natural gas, less than 4 vol·ppm $H_2S$, and less than 50 vol·ppm or even less than 10 vol·ppm total sulfur.

Composition of the Absorbent Solution

The absorbent solution used in the method according to the invention comprises:
a—water,
b—at least one diamine selected from among the bis (dialkylamino-3-propyl)ethers having the general formula (I) or the (dialkylamino-2-ethyl)-(dialkylamino-3-propyl)ethers having the general formula (II) as follows:

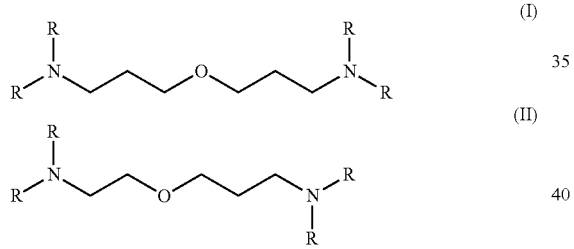

In general formulas (I) and (II), each radical R is independently selected from among a methyl radical or an ethyl radical.

For example, the absorbent solution according to the invention can comprise one of the diamine molecules as follows:

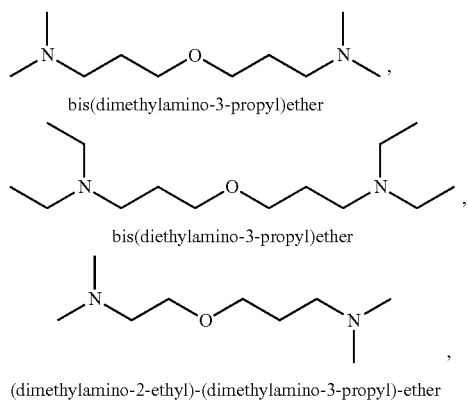

(dimethylamino-2-ethyl)-(dimethylamino-3-propyl)-ether

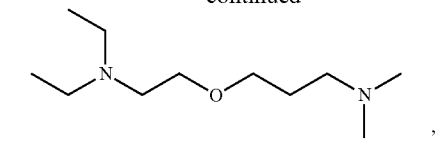

(diethylamino-2-ethyl)-(dimethylamino-3-propyl)-ether

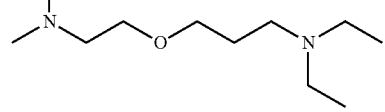

(dimethylamino-2-ethyl)-(diethylamino-3-propyl)-ether

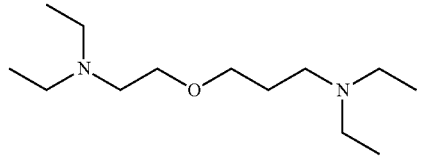

(diethylamino-2-ethyl)-(diethylamino-3-propyl)-ether

Preferably, the absorbent solution according to the invention comprises one of the diamine molecules as follows:

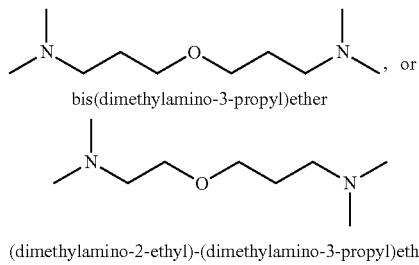

The diamines according to the invention can be in variable concentration in the absorbent solution, for example ranging between 10 wt. % and 90 wt. %, preferably between 20 wt. % and 60 wt. %, and more preferably between 30 wt. % and 50 wt. %.

The absorbent solution can contain between 10 wt. % and 90 wt. % water, preferably between 40 wt. % and 80 wt. % water, more preferably between 50 wt. % and 70 wt. %.

In one embodiment, the diamines according to the invention can be formulated with a compound containing at least one primary or secondary amine function. For example, the absorbent solution comprises up to a concentration of 20 wt. %, preferably below 15 wt. % and more preferably below 10 wt. % of said compound containing at least one primary or secondary amine function. Preferably, the absorbent solution comprises at least 0.5 wt. % of said compound containing at least one primary or secondary amine function. Said compound allows to accelerate the absorption kinetics of the COS and, in some cases, of the $CO_2$ contained in the gas to be treated.

A non-exhaustive list of compounds containing at least one primary or secondary amine function that can go into the formulation is given below:
Monoethanolamine,
N-butylethanolamine,
Aminoethylethanolamine,
Diglycolamine,
piperazine, N-(2-hydroxyethyl)piperazine,
N-(2-aminoethyl)piperazine,
Morpholine,
3-(methylamino)propylamine,
1,6-hexanediamine,
N,N'-dimethyl-1,6-hexanediamine.

The absorbent solution can furthermore comprise a physical solvent selected from among methanol and sulfolane for example.

Method of Removing Acid Compounds from a Gaseous Effluent

The use of an aqueous solution comprising a diamine according to the invention for deacidizing a gaseous effluent is achieved schematically by carrying out an absorption stage followed by a regeneration stage, as shown in FIG. 1 for example.

With reference to FIG. 1, the absorption stage consists in contacting gaseous effluent 1 with absorbent solution 4. Gaseous effluent 1 is fed to the bottom of column C1 and the absorbent solution is fed to the top of C1. Column C1 is provided with gas-liquid contacting means, for example a random packing, a stacked packing or distillation trays. Upon contacting, the amine functions of the diamines according to the invention of the absorbent solution react with the acid compounds contained in the effluent so as to obtain a gaseous effluent depleted in acid compounds 2 that leaves the top of column C1 and an absorbent solution enriched in acid compounds 3 that leaves the bottom of column C1 in order to be regenerated.

The regeneration stage notably consists in heating, and optionally in expanding, the absorbent solution enriched in acid compounds in order to release the acid compounds in gas form. The absorbent solution enriched in acid compounds 3 is fed into heat exchanger E1 where it is heated by stream 6 coming from regeneration column C2. Solution 5 heated at the outlet of E1 is fed into regeneration column C2.

Regeneration column C2 is equipped with gas-liquid contacting internals such as trays, random or stacked packings for example. The bottom of column C2 is fitted with a reboiler R1 that provides the heat required for regeneration by vaporizing a fraction of the absorbent solution. In column C2, under the effect of contacting the absorbent solution flowing in through 5 with the vapour produced by the reboiler, the acid compounds are released in gas form and discharged at the top of C2 through line 7. Regenerated absorbent solution 6, i.e. depleted in acid compounds 6, is cooled in E1, then recycled to column C1 through line 4.

The acid compound absorption stage can be carried out at a pressure in C1 ranging between 1 and 120 bars, preferably between 20 and 100 bars for natural gas treatment, preferably between 1 and 3 bars for industrial fumes treatment, and at a temperature in C1 ranging between 20° C. and 100° C., preferably between 30° C. and 90° C., or even between 30° C. and 60° C.

The regeneration stage of the method according to the invention can be carried out by thermal regeneration, optionally complemented by one or more expansion stages.

Regeneration can be carried out at a pressure in C2 ranging between 1 and 5 bars, or even up to 10 bars, and at a temperature in C2 ranging between 100° C. and 180° C., preferably between 130° C. and 170° C. Preferably, the regeneration temperature in C2 ranges between 155° C. and 180° C. in cases where the acid gases are intended to be reinjected.

EXAMPLES

In the following examples, aqueous solutions comprising between 30 wt. % and 50 wt. % diamine according to the invention are used as the absorbent solution.

Example 1

Synthesis Operating Mode

The operating mode for synthesis is given for the compounds with general formulas (I) and (II).

The following examples illustrate the synthesis of the molecules of the invention according to the first synthesis route described above, it being understood that all the synthesis possibilities for these molecules, regarding the synthesis routes as well as the possible operating modes, are not described here.

Synthesis of bis(dimethylamino-3-propyl)ether

An alcoholate of 3-dimethylamino-1-propanol is prepared by reaction thereof with an equimolar amount of soda in toluene. The condensation water is removed by azeotropic distillation. 2.86 moles of 3-dimethylamino-1-chloropropane are slowly added to 4.76 moles of this alcoholate refluxed in toluene. The reaction is continued for 1.5 hour. After cooling back to ambient temperature, 300 ml water are added and the organic phase is separated by decantation. The aqueous phase is extracted three times with toluene, then the organic phases are combined and, after distillation at reduced pressure, 359 g of a product matching the structure of the bis(dimethylamino-3-propyl)ether according to the 13C NMR (CDCl3) analysis are collected:

27.3 ppm: (CH3)2N—CH2-CH2-CH2-O—CH2-CH2-CH2-N(CH3)2
44.7 ppm: (CH3)2N—CH2-CH2-CH2-O—CH2-CH2-CH2-N(CH3)2
55.9 ppm: (CH3)2N—CH2-CH2-CH2-O—CH2-CH2-CH2-N(CH3)2
68.2 ppm: (CH3)2N—CH2-CH2-CH2-O—CH2-CH2-CH2-N(CH3)2

Synthesis of bis(diethylamino-3-propyl)ether 20.7 moles of diethylamine are carefully added to 6.88 moles of 3-chloro-1-propanol at ambient temperature by controlling the exotherm, then the reaction medium is fed into an autoclave reactor that is brought to 120° C. for 4 hours. After cooling back to ambient temperature, the excess diethylamine is distilled and the medium is neutralized with soda. After extraction with ether and distillation, 766 g of 3-diethylamino-1-propanol are collected. 1.91 mole of this product is treated with 2.03 mole of thionyl chloride in 750 ml dichloromethane at a temperature that does not exceed 20° C. Then, after distillation of the dichloromethane and of the thionyl chloride in excess and recrystallization with a mixture of alcohol and acetone, 291 g of a solid corresponding to 3-diethylamino-1-chloropropane hydrochloride are obtained. This hydrochloride (1.53 mole) is neutralized and added to 2.0 moles of sodium alcoholate of the previously prepared 3-diethylamino-1-propanol. The reaction is conducted under similar conditions to those of the previous example, except that water addition and extraction with ether are replaced by centrifugation of the salt formed. After distillation, 295 g of a product matching the structure of the bis(diethylamino-3-propyl)ether according to the 13C NMR (CDCl3) analysis are collected:

11.3 ppm: (CH3-CH2)2N—CH2-CH2-CH2-O—CH2-CH2-CH2-N(CH2-CH3)2
27.1 ppm: (CH3-CH2)2N—CH2-CH2-CH2-O—CH2-CH2-CH2-N(CH2-CH3)2

46.3 ppm: (CH3-CH2)2N—CH2-CH2-CH2-O—CH2-CH2-CH2-N(CH2-CH3)2

49.1 ppm: (CH3-CH2)2N—CH2-CH2-CH2-O—CH2-CH2-CH2-N(CH2-CH3)2

68.5 ppm: (CH3-CH2)2N—CH2-CH2-CH2-O—CH2-CH2-CH2-N(CH2-CH3)2

Synthesis of (dimethylamino-2-ethyl)-(dimethylamino-3-propyl)ether

An alcoholate of 2-dimethylaminoethanol is prepared by reaction thereof with an equimolar amount of soda in toluene. The condensation water is removed by azeotropic distillation. 0.89 moles of 3-dimethylamino-1-chloropropane are slowly added to 1.56 moles of this alcoholate refluxed in toluene. The reaction is continued for 3 hours. After cooling back to ambient temperature, 300 ml water are added and the organic phase is separated by decantation. The aqueous phase is extracted three times with toluene, then the organic phases are combined and, after distillation at reduced pressure, 78 g of a product matching the structure of the (dimethylamino-2-ethyl)-(dimethylamino-3-propyl) ether according to the 13C NMR (CDCl3) analysis are collected:

45.1 ppm: (CH3)2N—CH2-CH2-O—CH2-CH2-CH2-N(CH3)2

58.1 ppm: (CH3)2N—CH2-CH2-O—CH2-CH2-CH2-N(CH3)2

68.6 ppm: (CH3)2N—CH2-CH2-O—CH2-CH2-CH2-N(CH3)2

68.1 ppm: (CH3)2N—CH2-CH2-O—CH2-CH2-CH2-N(CH3)2

27.0 ppm: (CH3)2N—CH2-CH2-O—CH2-CH2-CH2-N(CH3)2

58.1 ppm: (CH3)2N—CH2-CH2-O—CH2-CH2-CH2-N(CH3)2

44.7 ppm: (CH3)2N—CH2-CH2-O—CH2-CH2-CH2-N(CH3)2

Example 2

Capture capacity of bis(dimethylamino-3-propyl)ether

The $CO_2$ capture capacity performances of the diamines according to the invention are notably compared with those of a 30 wt. % MonoEthanolAmine aqueous solution that is the reference solvent in a capture application for the $CO_2$ contained in post-combustion fumes. They are also compared with those of a 1,2-bis(2-dimethylaminoethoxy)ethane aqueous solution mentioned in U.S. Pat. No. 4,405,582 and those of the bis[2-(N,N-dimethylamino)ethyl]ether claimed in patent JP-8,257,353.

An absorption test is carried out on aqueous amine solutions in a perfectly stirred closed reactor whose temperature is controlled by a regulation system. For each solution, absorption is conducted in a 50-cm$^3$ liquid volume by injections of pure $CO_2$ from a reserve. The solvent solution is first evacuated prior to any $CO_2$ injection. The pressure of the gas phase in the reactor is measured and a global material balance on the gas phase allows to measure the solvent feed ratio α=nb moles of acid gas/nb moles of amine.

By way of example, the feed ratios (α=nb moles of acid gas/nb moles of amine) obtained at 40° C. for various $CO_2$ partial pressures are compared in Table 1 between bis (dimethylamino-3-propyl)ether absorbent solutions according to the invention, a MonoEthanolAmine absorbent solution, a 1,2-bis(2-dimethylaminoethoxy)ethane absorbent solution and a 30 wt. % bis-[2-(N,N-dimethylamino)ethyl] ether absorbent solution for a post-combustion $CO_2$ capture application.

Switching from a quantity for the feed ratio obtained in the laboratory to a quantity characteristic of the method requires some calculations that are explained below for the application sought.

In the case of a post-combustion $CO_2$ capture application, the $CO_2$ partial pressures in the effluent to be treated are typically 0.1 bar with a temperature of 40° C., and a 90% acid gas abatement is sought. The cyclic capacity $\Delta\alpha_{PC}$ expressed in moles of $CO_2$ per kg of solvent is calculated, considering that the solvent reaches its maximum thermodynamic capacity at the absorption column bottom $\alpha_{PPCO2=0.1\ bar}$ and must at least be regenerated below its thermodynamic capacity under the column top conditions $\alpha_{PPCO2=0.01\ bar}$ to achieve a 90% $CO_2$ abatement.

$$\Delta\alpha_{PC} = (\alpha_{PPCO2=0.1\ bar} - \alpha_{PPCO2=0.01\ bar}) \cdot [A] \cdot 10/M$$

where [A] is the amine concentration expressed in wt. % and M the molar mass of the amine in g/mol, $\alpha_{PPCO2=0.1\ bar}$ and $\alpha_{PPCO2=0.01\ bar}$ are the feed ratios (mole $CO_2$/mole amine) of the solvent at equilibrium respectively with a $CO_2$ partial pressure of 0.1 bar and 0.01 bar.

The reaction enthalpy can be obtained by calculation from several $CO_2$ absorption isotherms by applying Van't Hoff's law.

TABLE 1

| Generic name | Concentration | T (° C.) | Feed ratio $\alpha = n_{CO2}/n_{amine}$ $P_{PCO2} = 0.1$ bar | $P_{PCO2} = 0.01$ bar | $\Delta\alpha_{PC}$ (mol$_{CO2}$/kg solvent) | $\Delta H$ (kJ/mol$_{CO2}$) |
|---|---|---|---|---|---|---|
| MEA | 30 wt. % | 40 | 0.52 | 0.44 | 0.38 | 92 |
| 1,2-bis(2-dimethylaminoethoxy)ethane (described in document U.S. Pat. No. 4,405,582) | 30 wt. % | 40 | 1.01 | 0.21 | 1.18 | 62 |
| Bis[2-(N,N-dimethylamino)-ethyl] ether (described in document JP-8,257,353) | 30 wt. % | 40 | 0.96 | 0.23 | 1.38 | 59 |
| Bis(dimethylamino-3-propyl)ether (according to the invention) | 30 wt. % | 40 | 1.21 | 0.31 | 1.44 | 59 |

This example shows the higher feed ratios that can be obtained by means of an absorbent solution according to the invention, comprising 30 wt. % bis(dimethylamino-3-propyl)ether.

Furthermore, for a post-combustion fumes capture application where the $CO_2$ partial pressure in the effluent to be treated is 0.1 bar, this example illustrates the higher cyclic capacity obtained using an absorbent solution according to the invention, comprising 30 wt. % molecules allowing to reach 90% abatement at the absorber outlet. In this application where the energy associated with the regeneration of the solution is critical, it can be noted that the amine according to the invention allows to obtain a much better compromise than MEA in terms of cyclic capacity and reaction enthalpy. A gain in terms of cyclic capacity and reaction enthalpy of the formulation according to the invention is also observed in relation to the 1,2-bis(2-dimethylaminoethoxy)ethane mentioned in U.S. Pat. No. 4,405,582 and the bis[2-(N,N-dimethylamino)ethyl]ether claimed in patent JP-8,257,353.

Example 3

Capture capacity of bis(dimethylamino-3-propyl) ether and (dimethylamino-2-ethyl)-(dimethylamino-3-propyl)ether solutions activated with piperazine The $CO_2$ capture capacity performances of aqueous amine solutions according to the invention in admixture with piperazine are notably compared with those of a 30 wt. % aqueous MonoEthanolAmine solution, which is the reference solvent in a capture application for the $CO_2$ contained in post-combustion fumes. They are also compared with those of an aqueous 1,2-bis-(2-dimethylaminoethoxy)-ethane solution, mentioned in U.S. Pat. No. 4,405,582 and containing the same percentage by weight of tertiary diamine and piperazine.

The absorption tests are carried out as described in Example 2.

By way of example, Table 2 compares the feed ratios ($\alpha$=nb moles of acid gas/nb moles of amine) obtained at 40° C. for various $CO_2$ partial pressures between 30 wt. % absorbent bis(dimethylamino-3-propyl)ether and (dimethylamino-2-ethyl)-(dimethylamino-3-propyl)ether solutions according to the invention containing 5 wt. % piperazine to accelerate the post-combustion $CO_2$ capture kinetics, a 30 wt. % MonoEthanolAmine absorbent solution and an absorbent 1,2-bis(2-dimethylaminoethoxy)ethane solution containing 5 wt. % piperazine.

The feed ratios $\alpha_{PPCO2=0.1\ bar}$ and $\alpha_{PPCO2=1\ bar}$ are as defined in Example 2.

The cyclic capacity $\Delta\alpha_{PC}$ expressed in moles of $CO_2$ per kg of solvent is calculated as in Example 2:

$$\Delta\alpha_{PC}=(\alpha_{PPCO2=0.1\ bar}-\alpha_{PPCO2=0.01\ bar})\cdot[A]\cdot10/M$$

where [A] is the total amine concentration expressed in wt. % and, in the case of amine mixtures, M is the average molar mass of the amine mixture in g/mol:

$$M=[A]/([DA]/M_{DA}+[PZ]/M_{PZ}),$$

where [DA], [PZ] are the tertiary amine and piperazine concentrations respectively, expressed in wt. %, $M_{DA}$ and $M_{PZ}$ are the tertiary diamine and piperazine molar masses respectively, expressed in mol/kg.

TABLE 2

| Solvent | T (° C.) | Feed ratio $\alpha$ = $n_{CO2}/n_{amine}$ | | $\Delta\alpha_{PC}$ (mol$_{CO2}$/kg solvent) |
|---|---|---|---|---|
| | | $P_{PCO2}$ = 0.1 bar | $P_{PCO2}$ = 0.01 bar | |
| 30 wt. % MEA | 40 | 0.52 | 0.44 | 0.38 |
| 30 wt. % 1,2-bis(2-dimethylaminoethoxy(ethane (described in document U.S. Pat. No. 4,405,582) + 5 wt. % piperazine | 40 | 0.82 | 0.37 | 0.93 |
| 30 wt. % bis(dimethylamino-3-propyl)ether (according to the invention) + 5 wt. % piperazine | 40 | 1.04 | 0.47 | 1.25 |
| 30 wt. % (dimethylamino-2-ethyl)-(dimethylamino-3-propyl)ether (according to the invention) + 5 wt. % piperazine | 40 | 1.05 | 0.44 | 1.29 |

This example shows the higher feed ratios that can be obtained by means of an absorbent solution according to the invention, comprising 30 wt. % bis(dimethylamino-3-propyl)ether or (dimethylamino-2-ethyl)-(dimethylamino-3-propyl)ether and 5 wt. % piperazine.

Furthermore, for a post-combustion fumes capture application where the $CO_2$ partial pressure in the effluent to be treated is 0.1 bar, this example illustrates the higher cyclic capacity obtained using an absorbent solution according to the invention, comprising 30 wt. % tertiary diamine according to the invention and 5 wt. % piperazine allowing to reach 90% abatement at the absorber outlet in relation to the 30 wt. % MEA.

A gain in terms of cyclic capacity of the formulation according to the invention is also observed in relation to the 1,2-bis(2-dimethylaminoethoxy)ethane mentioned in U.S. Pat. No. 4,405,582.

Example 4

Stability of an Amine Solution According to the Invention

The diamines used according to the invention have the specific feature of being particularly resistant to the degradations that may occur in a deacidizing unit.

A degradation test is carried out on aqueous amine solutions in a closed reactor whose temperature is controlled by a regulation system. For each solution, the test is carried out in a 50-cm$^3$ liquid volume injected in the reactor. The solvent solution is first evacuated prior to any gas injection and the reactor is then placed in a heating shell at the setpoint temperature and subjected to magnetic stirring. The concerned gas is then injected at the desired partial pressure. This pressure is added to the initial pressure due to the vapour pressure of the aqueous amine solution. Various degradation conditions are tested:

thermal degradation: tested in the absence of acid gas, only the test temperature is kept constant and the vapour pressure of the solvent is measured, degradation in $CO_2$: $CO_2$ is injected so as to reach a partial pressure of 20 bars, degradation in $O_2$: air is injected at a partial pressure of 20 bars, which gives an oxygen partial pressure of 4.2 bars.

Table 3 below gives the degradation rate TD, through degradation in $CO_2$, of the bis(dimethylamino-3-propyl) ether according to the invention and of the bis(2-dimethylaminoethyl)ether described in document JP-8,257,353, as well as MEA as the reference amine, for a duration of 15 days, defined by the equation hereafter:

$$TD(\%) = \frac{[A] - [A]°}{[A]°}$$

where [A] is the compound concentration in the degraded sample and [A]° is the compound concentration in the non-degraded solution. Concentrations [A] and [A]° are determined by gas chromatography.

TABLE 3

| Amine | Concentration | T (° C.) | $PP_{CO2}$ = 20 bar TD(%) |
|---|---|---|---|
| MEA | 30 wt. % | 140 | 42% |
| bis(2-dimethylaminoethyl)ether (described in JP-8,257,353) | 50 wt. % | 140 | 32% |
| Bis(dimethylamino-3-propyl)ether (according to the invention) | 50 wt. % | 140 | 12% |

Table 4 below gives the degradation rate TD, through degradation in $O_2$, of the bis(dimethylamino-3-propyl)ether according to the invention, as well as MEA as the reference amine, for a duration of 15 days, defined as above:

TABLE 4

| Amine | Concentration | T (° C.) | $PP_{O2}$ = 4.2 bar TD(%) |
|---|---|---|---|
| MEA | 30 wt. % | 140 | 21% |
| Bis(dimethylamino-3-propyl)ether (according to the invention) | 50 wt. % | 140 | 14% |

Table 5 below gives the degradation rate TD under thermal degradation conditions, for a temperature of 180° C., in the absence of acid gas, which is representative of the degradations that might occur at the regenerator bottom, if it is desired to obtain an acid gas at high pressure for reinjection applications.

TABLE 5

| Amine | Concentration | T (° C.) | Degradation rate Absorbent solution vapour pressure |
|---|---|---|---|
| Bis(2-dimethylamino-ethyl)ether (described by JP-8,257,353) | 50 wt. % | 180 | 35% |
| Bis(dimethylamino-3-propyl)ether (according to the invention) | 50 wt. % | 180 | 5% |

This example shows that using compounds according to the invention as an amine in an absorbent solution allows to obtain a low degradation rate in relation to the amine-based absorbent solutions of the prior art (MonoEthanolAmine and bis(2-dimethylaminoethyl)ether described in document JP-8,257,353). It is therefore possible to regenerate the absorbent solution at higher temperature and thus to obtain an acid gas at higher pressure. This is particularly interesting in case of post-combustion $CO_2$ capture where the acid gas must be compressed to be liquefied prior to reinjection.

Example 5

Capacity and selectivity for $H_2S$ removal from a gaseous effluent containing $H_2S$ and $CO_2$ by bis (dimethylamino-3-propyl)ether and (dimethylamino-2-ethyl)-(dimethylamino-3-propyl)ether solutions An absorption test is carried out at 40° C. on aqueous amine solutions in a perfectly stirred reactor open on the gas side.

For each solution, absorption is conducted in a 50-cm³ liquid volume by bubbling of a gas stream consisting of a mixture of nitrogen:carbon dioxide:hydrogen sulfide in a volume proportion of 89:10:1, at a flow rate of 30 NL/h for 90 minutes.

The $H_2S$ feed ratio obtained ($\alpha$=nb moles of $H_2S$/kg of absorbent solution) and the absorption selectivity over $CO_2$ are measured at the end of the test.

This selectivity S is defined as follows:

$$S = (\alpha_{H2S}/\alpha_{CO2}) \cdot \frac{(CO_2 \text{ concentration of the gaseous mixture})}{(H_2S \text{ concentration of the gaseous mixture})}$$

i.e., under the conditions of the test described here, S=10 ($\alpha_{H2S}/\alpha_{CO2}$).

By way of example, one can compare the feed ratios and the selectivity between 50 wt. % bis(dimethylamino-3-propyl)ether absorbent solutions and 50 wt. % (dimethylamino-2-ethyl)-(dimethylamino-3-propyl)ether absorbent solutions according to the invention and a 47 wt. % methyldiethanolamine absorbent solution, as well as a 50 wt. % 1,2-bis(N,N-diethylaminoethoxy)ethane absorbent solution, a molecule according to the general formula of U.S. Pat. No. 4,405,582.

TABLE 6

| Compound | Concentration | T (° C.) | H2S feed ratio (mole/kg) | Selectivity |
|---|---|---|---|---|
| MDEA | 47% | 40 | 0.16 | 6.3 |
| 1,2-bis(N,N-diethylaminoethoxy) ethane (described in document U.S. Pat. No. 4,405,582) | 50% | 40 | 0.17 | 6.2 |
| Bis(dimethylamino-3-propyl)ether (according to the invention) | 50% | 40 | 0.22 | 7.2 |
| (dimethylamino-2-ethyl)-(dimethylamino-3-propyl)-ether (according to the invention) | 50% | 40 | 0.21 | 7.5 |

This example illustrates the feed ratio and selectivity gains that can be reached with an absorbent solution according to the invention, comprising 50 wt. % bis(dimethylamino-3-propyl)ether or (dimethylamino-2-ethyl)-(dimethylamino-3-propyl) ether.

The invention claimed is:

1. A method of removing acid compounds contained in a gaseous effluent, the gaseous effluent being selected from the group consisting of natural gas, syngas, combustion fumes, relinery gas, acid gas from amine units, Claus tail gas, biomass fermentation gas, cement gas plant gas and incinerator fumes, the acid compounds including at least one selected from the group consisting of $CO_2$, $H_2S$, mercaptans, COS, $CS_2$, and $SO_2$, the method comprising:

contacting the gaseous effluent with an absorbent solution during an acid compound absorption stage, the absorbent solution comprising:
water,
at least one diamine selected from among the molecules with general formulas (I) and (II):

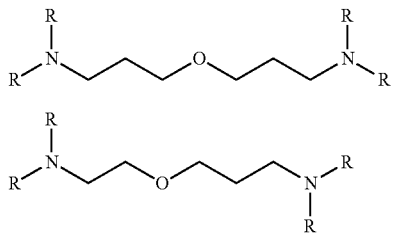
(I)
(II)

wherein each radical R is independently selected from among a methyl radical or an ethyl radical.

2. The method as claimed in claim 1, wherein the at least one diamine is selected from the group consisting of:

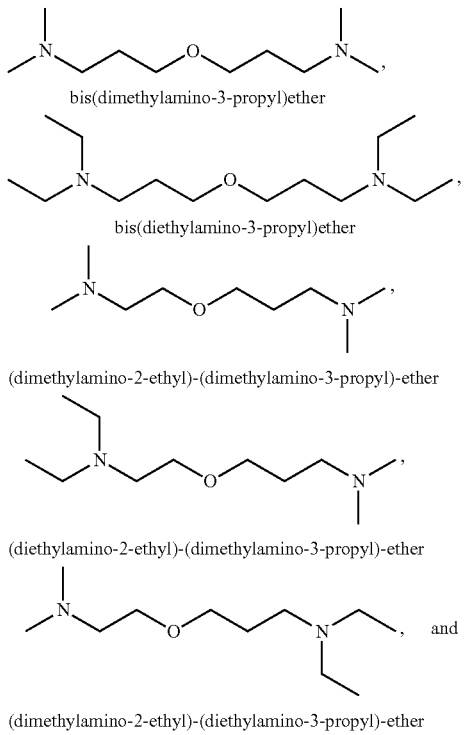

bis(dimethylamino-3-propyl)ether bis(diethylamino-3-propyl)ether (dimethylamino-2-ethyl)-(dimethylamino-3-propyl)-ether (diethylamino-2-ethyl)-(dimethylamino-3-propyl)-ether (dimethylamino-2-ethyl)-(diethylamino-3-propyl)-ether, and

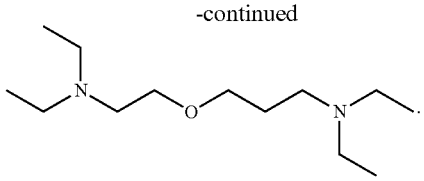

(diethylamino-2-ethyl)-(diethylamino-3-propyl)-ether

3. The method as claimed in claim 1, wherein the absorbent solution comprises between 10 wt. % and 90 wt. % of the at least one diamine and between 10 wt. % and 90 wt. % water.

4. The method as claimed in claim 1, wherein the absorbent solution also comprises a non-zero proportion below 20 wt. % of a primary or secondary amine.

5. The method as claimed in claim 4, wherein the primary or secondary amine is selected from the group consisting of:
MonoEthanolAmine,
N-butylethanolamine,
Aminoethylethanolamine,
Diglycolamine,
Piperazine,
N-(2-hydroxyethyl)piperazine,
N-(2-aminoethyl)piperazine,
Morpholine,
3-(metylamino)propylamine,
1,6-hexanediamine, and
N,N'-dimethyl-1,6-hexanediamine.

6. The method as claimed in claim 1, wherein the absorbent solution furthermore comprises a physical solvent selected from among methanol and sulfolane.

7. The method as claimed in claim 1, wherein the acid compound absorption stage is carried out at a pressure ranging between 1 bar and 120 bars, and at a temperature ranging between 20° C. and 100° C.

8. The method as claimed in claim 1 wherein, after the absorption stage, a gaseous effluent depleted in acid compounds and an absorbent solution laden with acid compounds are obtained, and the method further comprises regenerating the absorbent solution laden with acid compounds during at least one regeneration stage.

9. The method as claimed in claim 8, wherein the at least one regeneration stage is carried out at a pressure ranging between 1 bar and 10 bars, and at a temperature ranging between 100° C. and 180° C.

10. The method as claimed in claim 1, wherein the gaseous effluent comprises $H_2S$ and $CO_2$, the method being implemented for selective $H_2S$ removal over $CO_2$.

* * * * *